United States Patent [19]
Gold

[11] Patent Number: 5,683,165
[45] Date of Patent: *Nov. 4, 1997

[54] AFTERMARKET IMPROVEMENTS FOR AN INDUSTRIAL VAN

[76] Inventor: Peter Gold, 465 N. Wood Rd., Rockville Centre, N.Y. 11570

[*] Notice: The term of this patent shall not extend beyond the expiration date of Pat. No. 5,523,926.

[21] Appl. No.: 751,974

[22] Filed: Nov. 19, 1996

[51] Int. Cl.$^6$ .................................................. B60Q 1/48

[52] U.S. Cl. .......................... 362/80; 362/83.3; 362/249; 340/472

[58] Field of Search ............................ 362/80, 83.3, 249, 362/252, 80.1, 184, 61; 340/469, 472, 473, 470

[56] References Cited

U.S. PATENT DOCUMENTS

| | | | |
|---|---|---|---|
| 2,844,810 | 7/1958 | Steele, Jr. | 362/80 |
| 2,853,595 | 9/1958 | Baldwin | 362/80 |
| 3,582,639 | 6/1971 | Chamberlain | 362/80 |
| 5,193,895 | 3/1993 | Naruke et al. | 362/80 |
| 5,504,974 | 4/1996 | Graber | 16/112 |
| 5,523,926 | 6/1996 | Gold | 362/80 |

Primary Examiner—Thomas M. Sember
Attorney, Agent, or Firm—Myron Amer R.C.

[57] ABSTRACT

To promote safer use of an industrial van of a type having a body with right and left pivotally hinged doors usually opened preparatory to workmen working out of the rear of the van, there is provided an additional light display on a cooperating edge of each of the doors in facing relation to an oncoming motorist to mark the stationary van as a road obstruction.

2 Claims, 1 Drawing Sheet

AFTERMARKET IMPROVEMENTS FOR AN INDUSTRIAL VAN

The present invention relates generally to improvements for an industrial van, said improvements being applied in the aftermarket to the industrial van as received from an OEM (original equipment manufacturer) source, and which aftermarket application more particularly results in providing a safer working environment for the van.

As known, an industrial van is in wide use for street repair and like industrial use, wherein the van typically is parked adjacent an open "manhole", and repairmen, such as gas or electrical utility employees, work out of the rear of the van to repair below ground gas mains, electrical cables and the like. In the evening or other periods of diminished visibility, illumination and road blocks are strategically placed to cordon off the work area and to mark the stationary van as a road obstruction. Although a simple routine, it is nevertheless an added responsibility and, until the safety devices, such as illumination and road blocks and the like are in place, there is potential danger from vehicles passing the work site, particularly since often the safety devices are within the van and thus require that the van assume its road-obstructing position necessarily before the safety devices are in place.

Broadly, it is an object of the present invention to provide improvements for a van, specifically in the way of a safety or warning light display, overcoming the foregoing and other shortcomings of the prior art.

More particularly, it is an object to apply to a purchased industrial van additional light-signalling means to supplement the lighting at a work area or site, all as will be better understood as the description proceeds.

It is to be noted that in my prior patent, U.S. Pat. No. 5,523,926 for "Industrial Van" issued on Jun. 4, 1996, which by this reference is incorporated herein in its entirety, the within lighting improvements and those of the '926 patent are substantially the same, except that the latter is battery-operated and thus more appropriately provided as an OEM embodiment. The lighting improvement in this application, by contrast, is provided by a light-reflecting means and as such is readily provided in the so-called aftermarket. Because the utility is safer use of industrial van, the aftermarket option is of significant importance.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
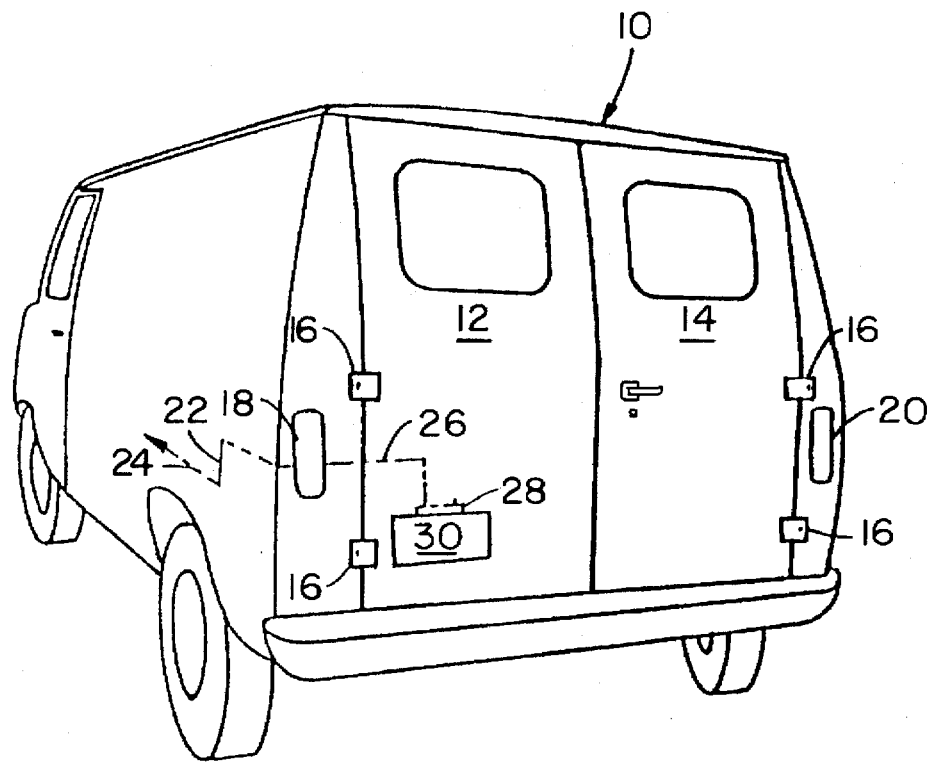
FIG. 1 is a rear perspective view of an industrial van.
Figure 2:
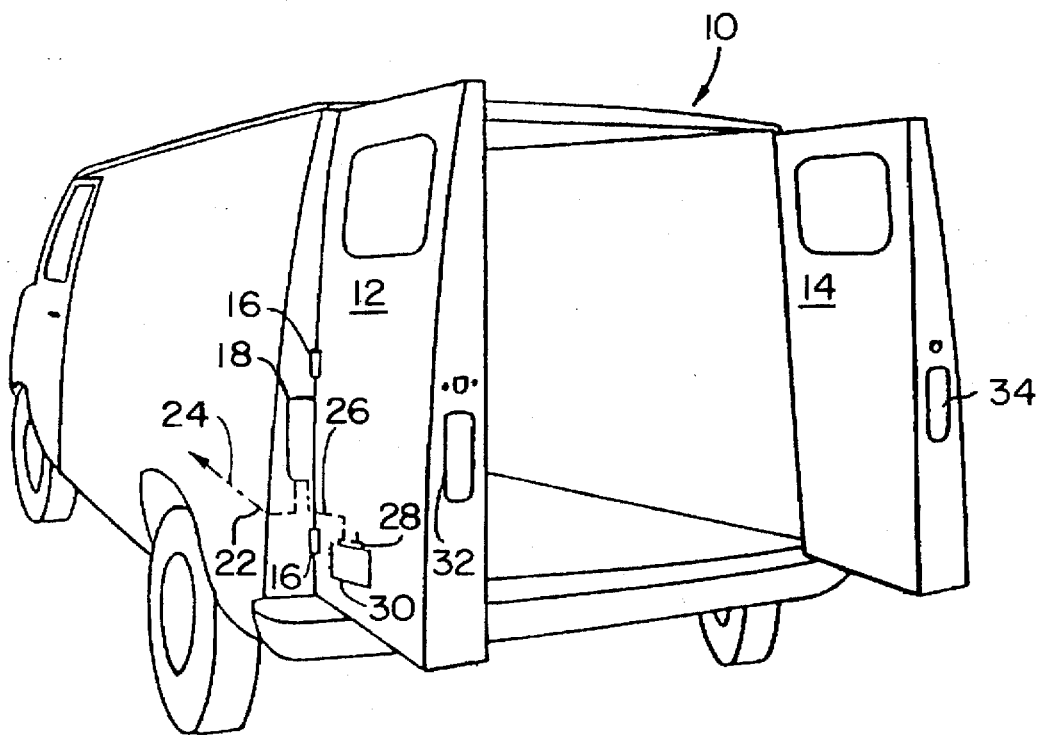
FIG. 2 is likewise a rear perspective view, but illustrating the rear doors in an open condition.

As generally understood, and as shown in FIG. 1, an industrial van 10 has rear left 12 and right 14 doors mounted on hinges 16 and includes a rear display outwardly thereof of left and right side rear or so-called tail lights 18 and 20 electrically connected by circuitry 22 to the van battery, as noted by the arrow reference line 24. A part of the circuitry 22 includes an electrical connection 26 to illumination 28 for a displayed license plate 30.

The present invention is concerned with providing an option to work out of the rear of the van under safe conditions, as will be better understood as the description proceeds. The safer conditions are necessary because during the evening and other periods of reduced visibility, the original equipment manufacture (OEM) lights 18 and 20, in some instances even the illuminated license plate 30, are obscured to an approaching motorist by the open doors 12 and 14. That is, to a motorist approaching from the rear in the same lane occupied by the van 10 there will be obscured visibility of the OEM lights 18 and 20. Similarly, to a motorist apporaching and passing in the left lane, the right OEM tail light 20 will be obscured by the rearwardly extending right door 14, and to a motorist approaching and passing in the right lane, the left OEM tail light 18 will be obscured by the rearwardly extending left door 12. Thus, patches 32 and 34 of adhesively attached commercially available reflective tape or light-reflecting material, such as supplied by Duplicolon Products Co., ELK Grove Village, Ill., having a painted reflective surface of a type currently used for marking roadside obstacles, hazards, curbs and parking areas, are, in the locations illustrated, provided, and are effective in response to light from headlights of approaching traffic impinging thereon in providing a safe environment to workmen, as such as employees of a gas utility, who typically work out of the rear of a van carrying equipment necessary for repair of gas mains or the like. The van 10 with open doors 12 and 14 is usually parked in a central location of an active street adjacent an open "manhole" through which access is obtained to below ground gas transmission facilities, and the additional auxiliary light displays 32 and 34 provide notice to motorists passing left and right of the van 10, as well as approaching directly from behind the van 10, that the stationary van 10 is a road obstruction.

While the added light displays herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown, other than as defined in the appended claims.

What is claimed is:

1. Improvements for providing a safe environment for workmen working out of a rear of a van of a type having a body with right and left pivotally hinged doors and tail lights displayed to an oncoming motorist located outwardly of a hinge axis of said right and left doors illuminated by a battery of said van, wherein said tail lights are obscured to said oncoming motorist when said right and left doors are in an open condition, said improvements comprising said right and left doors each having an operative open condition extending rearwardly of said van so as to bound therebetween a designated safe work area for a user of said van, an additional light-reflecting means on a cooperating edge of each said door in facing relation to said oncoming motorist to serve as a light display on opposite sides of said designated work area, whereby reflected light resulting from light from headlights of approaching traffic impinging upon said light-reflecting means contributes to providing notice of an existence of said van as a road obstruction and to safety of said user of said van located in said designated work area.

2. The light display improvements as claimed in claim 1 wherein said light-reflecting means are at least two patches, each manually adhesively secured after a purchase of said van to a cooperating one said door edge.

* * * * *